United States Patent [19]
Karp

[11] Patent Number: 5,796,070
[45] Date of Patent: Aug. 18, 1998

[54] WELDING GUN SPATTER SHIELD

[76] Inventor: James B. Karp, Rt. 4, Box 771, New Caney, Tex. 77357

[21] Appl. No.: 724,424

[22] Filed: Oct. 1, 1996

[51] Int. Cl.⁶ .................................................... B23K 9/16
[52] U.S. Cl. .................................................... 219/137.43
[58] Field of Search ........................ 219/137.42, 137.43

[56] References Cited

U.S. PATENT DOCUMENTS

| | | |
|---|---|---|
| 2,909,645 | 10/1959 | Berg . |
| 3,430,837 | 3/1969 | Hein . |
| 3,659,076 | 4/1972 | Ogden, Sr. .................... 219/137.42 |
| 4,280,043 | 7/1981 | Feix et al. . |
| 4,947,024 | 8/1990 | Anderson . |
| 5,278,392 | 1/1994 | Takacs . |

FOREIGN PATENT DOCUMENTS

| | | | |
|---|---|---|---|
| 58-125376 | 7/1983 | Japan .................... | 219/137.42 |
| 60-21184 | 2/1985 | Japan .................... | 219/137.43 |
| 62-13273 | 1/1987 | Japan .................... | 219/137.43 |

*Primary Examiner*—Clifford C. Shaw
*Attorney, Agent, or Firm*—Keeling Law Firm

[57] ABSTRACT

A welding gun spatter shield for insertion in the sleeve opening of a welding gun that prevents contact of spatter with the welding gun components and that prevents the accumulation of spatter on the welding gun. The shield is a body that fits within or over the opening of the welding gun sleeve and fills the opening forming a barrier beyond which the spatter may not pass. The body has a wire feed bore extending axially therethrough to permit the welding wire to extend therethrough. Further, the body includes communication passageways that permit the inert gas to pass through the body in an axial direction. The welding gun spatter shield uses either a friction fit or a retaining ring to maintain the body attached to the sleeve.

20 Claims, 5 Drawing Sheets

5,796,070

1

WELDING GUN SPATTER SHIELD

BACKGROUND OF THE INVENTION

1. Field of Invention

This invention relates to a spatter shield for a welding gun. More specifically, it is directed to a low cost insert that eliminates spatter from accumulating on the welding gun.

In Metal Inert Gas (MIG) welding, also known as Gas Metal Arc Welding, a continuous feed of welding wire feeds through the welding gun and provides the source material for the weld while an inert gas supplied through the welding gun supplies a shielding gas for the welding operation. One difficulty associated with MIG welding is that the process generates substantial weld spatter.

The weld spatter adheres to and accumulates on the various parts of the welding gun causing the parts to deteriorate. Accumulation of the spatter on the internal surface of the contact tube increases the friction and reduces the electrical contact with the welding wire and, thereby, slows the welding operation. Deterioration of the contact tube caused by the accumulation often results in "burn backs" wherein the arc extends to the contact tube. The burn backs may cause the welding wire to fuse to the contact tube leading to frequent required replacement of the contact tube.

As weld spatter accumulates on the sleeve, or nozzle, of the welding gun, the accumulation restricts the flow of the welding gas to the weld. Insufficient shielding gas during the welding process will cause a flawed weld that delays the process and may cause waste of the pieces being welded. Therefore, the welding spatter must be frequently removed from the welding gun to ensure a proper weld. Removal of the spatter slows the welding process and reduces the efficiency of the process. In addition, the deterioration caused by the welding spatter requires periodic replacement of the sleeve.

Thus, the accumulation of welding spatter on the welding gun creates inefficiencies in the welding process by (1) slowing the process, (2) requiring periodic replacement of the welding gun components, and (3) causing flawed welds. These problems associated with welding spatter increase the cost of the weld.

2. Related Art

The problems associated with welding spatter have long been known to the prior art. A number of prior efforts have attempted to address this problem. Illustrative of such efforts are U.S. Pat. No. 2,909,645 that issued to Berg, U.S. Pat. No. 3,430,837 that issued to Hein, U.S. Pat. No. 4,280,043 that issued to Feix et al., U.S. Pat. No. 4,947,024 that issued to Anderson, and U.S. Pat. No. 5,278,392 that issued to Takacs.

Previous efforts at resolving the problems associated with weld spatter have been directed at tapering the contact tube to reduce the surface area near the weld (Berg), coating the welding gun components with a layer of material having anti-stick characteristics (Hein, Anderson, and Takacs), or providing a mechanical scraper on the welding gun (Feix et al.). Though these efforts may be helpful in reducing spatter accumulation or in removing spatter that has accumulated on the welding gun, they do not eliminate spatter accumulation on the welding gun and its components.

SUMMARY OF THE INVENTION

Accordingly, the objectives of this invention are to provide, inter alia, a welding gun spatter shield that:

eliminates spatter accumulation on the welding gun and its components;

2 blocks the opening to the welding gun sleeve, or nozzle, and prevents welding spatter from entering the sleeve;

permits the flow of inert gas therethrough; increases the efficiency of MIG welding by (1) reducing down-time required for removing spatter accumulation, (2) reducing the deteriorating effects associated with spatter accumulation, (3) preventing mechanical stoppages and wire feed retardation caused by the spatter accumulation, and (4) preventing restriction of the inert gas flow and the problems associated therewith;

is simple to use and low in cost; and may be used with existing welding gun sleeve, or nozzle, designs allowing for greater universality and further reducing the costs associated therewith.

Other objects of the invention will become apparent from time to time throughout the specification and claims as hereinafter related.

To achieve such improvements, my invention is a welding gun spatter shield that has a body constructed and sized to fit at least partially within the opening of a welding gun sleeve, or nozzle. The body is constructed and sized to fill the opening and provide complete coverage of the cross sectional area of the opening. The body includes a wire feed bore that extends therethrough in an axial direction. The wire feed bore is sufficiently large to permit a welding wire to pass therethrough and is positioned in the body such that the wire feed bore is aligned with the welding wire when the body is mounted in the opening. At least one communication passageway extending in an axial direction through the body provides fluid communication through the body.

BRIEF DESCRIPTION OF THE DRAWINGS

The manner in which these objectives and other desirable characteristics can be obtained is explained in the following description and attached drawings in which.

DETAILED DESCRIPTION OF THE INVENTION

Figure 1:
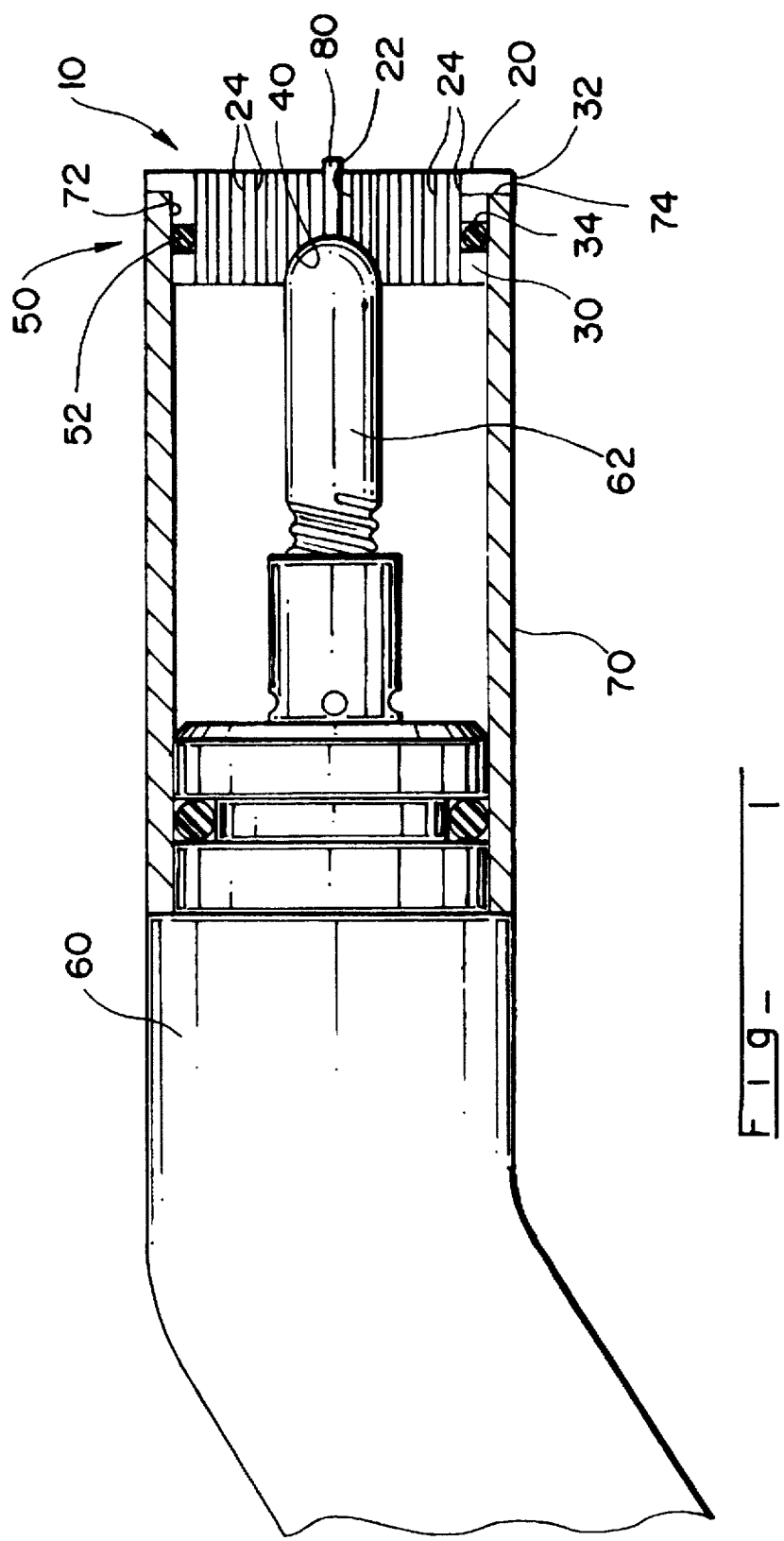
FIG. 1 is a partial cross sectional side elevational view of a welding gun having a welding gun spatter shield mounted therein.

The preferred embodiment of my invention is illustrated in FIGS. 1 through 9 and the welding gun spatter shield is depicted as 10. In general, the welding gun spatter shield 10 has a body 20, a wire feed bore 22 extending through the body 20 in an axial direction, at least one communication passageway 24 providing flow communication through the body 20 in an axial direction, and a retaining means 50 for removably maintaining the body 20 in welding gun 60.

Figure 4:
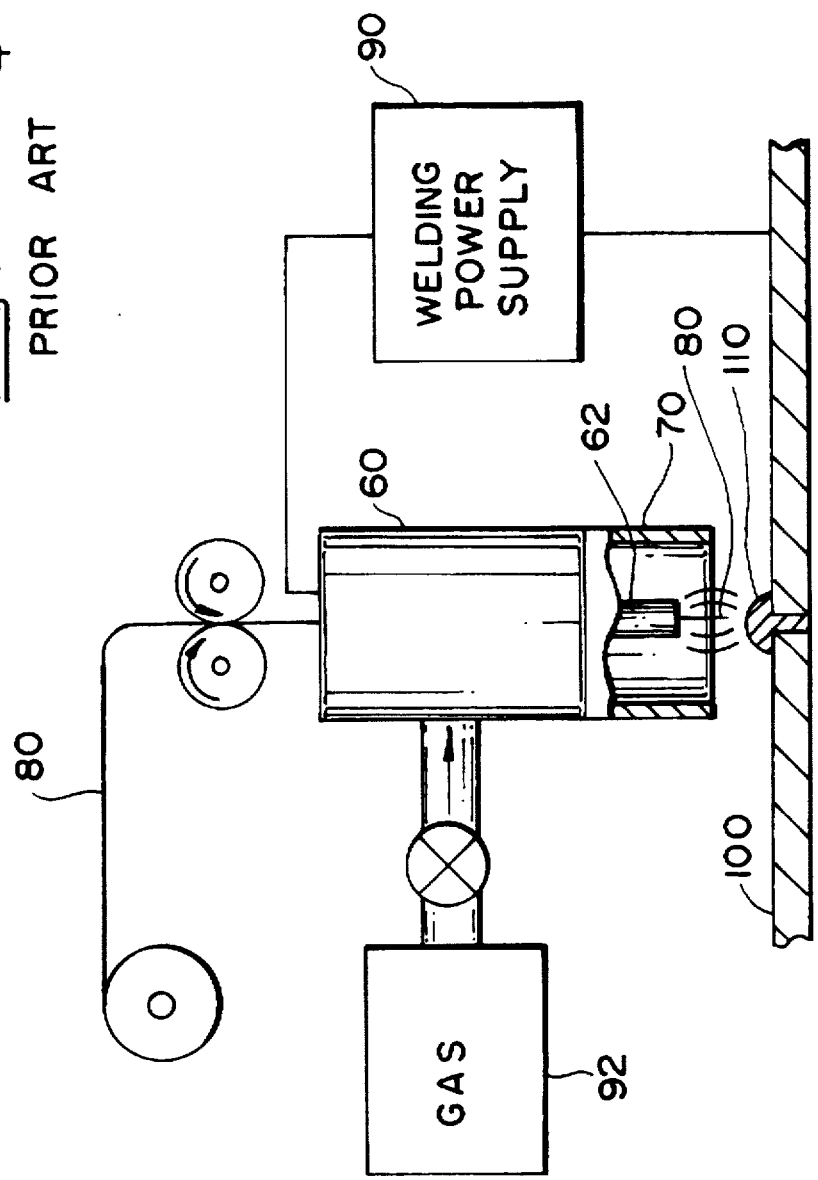
FIG. 4 is a schematic drawing of a typical welding gun.

FIG. 4 is a schematic of a typical MIG type welding gun 60. The welding gun 60 includes a supply of welding wire 80 that furnishes a continuous feed of welding wire 80 for the weld. A contact tube 62 holds the welding wire 80 in position. The welding gun 60 directs an inert gas that shields the welding process from the gas source 92 to the weld. The welding gun sleeve 70 both directs the inert gas to the weld and protects the components of the welding gun 60. A power supply 90 is electrically connected to the contact tube 62 and a metal workpiece 100. Activating the power supply 90 produces an electric arc between the workpiece 100 and the tip of the welding wire 80 that forges a weld fillet 110 formed of molten metal from the welding wire 80.

Typically, the sleeve 70, or nozzle, of the welding gun 60 has an annular cross section along its full length and may be cylindrical or frustoconical. The contact tube 62 and the welding wire 80 are generally concentric with the sleeve 70. As shown in the figures, the forward end 74 of the sleeve 70 defines an orifice into the opening 72 of the sleeve 70. Because the wall thickness of the sleeve 70 is typically uniform, the shape of the opening 72 is typically cylindrical or frustoconical.

The body 20 of the welding gun spatter shield 10 has an axis and opposing faces. Because the welding gun spatter shield 10 is positioned in the high temperature environment of an arc weld, the material used for the body 20 must be capable of withstanding relatively high temperatures. Likewise, because the purpose of the welding gun spatter shield 10 is to prevent the accumulation of spatter, the body 20 is preferably formed of a material having anti-stick characteristics. Examples of suitable materials for the body 20 include, inter alia, ceramic coated aluminum, anodized aluminum, and porous ceramic.

The body 20 is constructed and sized for at least partial receipt within the sleeve opening 72. When placed in the opening 72, the body 20 fills the opening 72 and covers the full cross sectional area of the opening 72. In this way, the body 20 forms a barrier across the opening 72 beyond which no spatter may pass. To accomplish full coverage of the opening 72 by the body 20, the shape of the body 72 is preferably the same as the opening 72. Typically, the sleeve opening 72 has a circular cross section throughout its full length. Accordingly, the body 20, or at least the portion of the body 20 to be inserted in the opening 72, also has a circular cross section. Likewise, a typical opening is cylindrical. Consequently, the portion of the body to be inserted in the opening 72 is also cylindrical. To enable the insertion and removal of the body in the opening 72 the diameter of the body 20 is slightly less than the diameter of the opening 72. So that the parts are aligned, the body 20 is preferably substantially coaxial with the sleeve 70 and the opening 72 when mounted therein.

Figure 2:
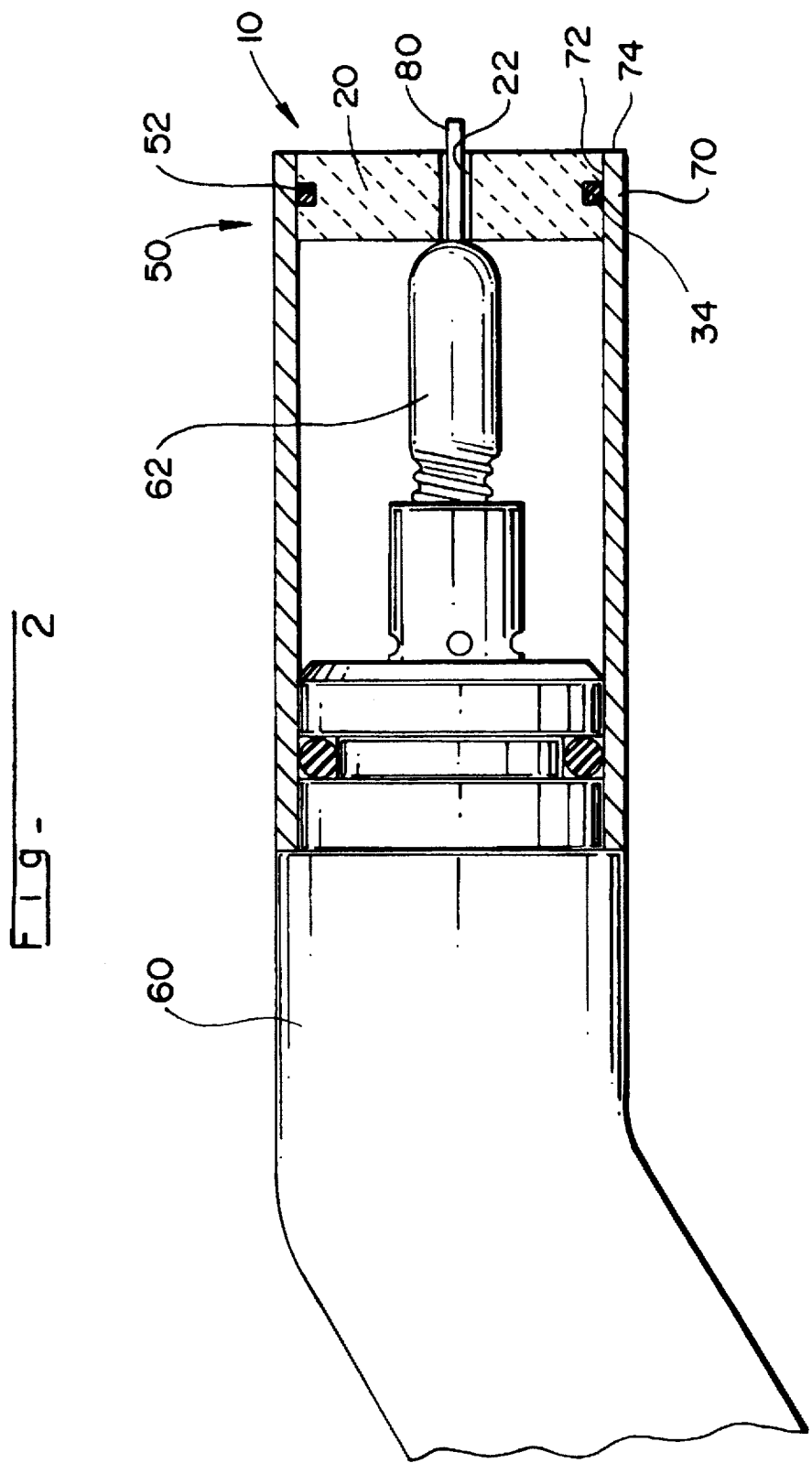
FIG. 2 is a partial cross sectional side elevational view of a welding gun having a welding gun spatter shield mounted therein.
Figure 3:
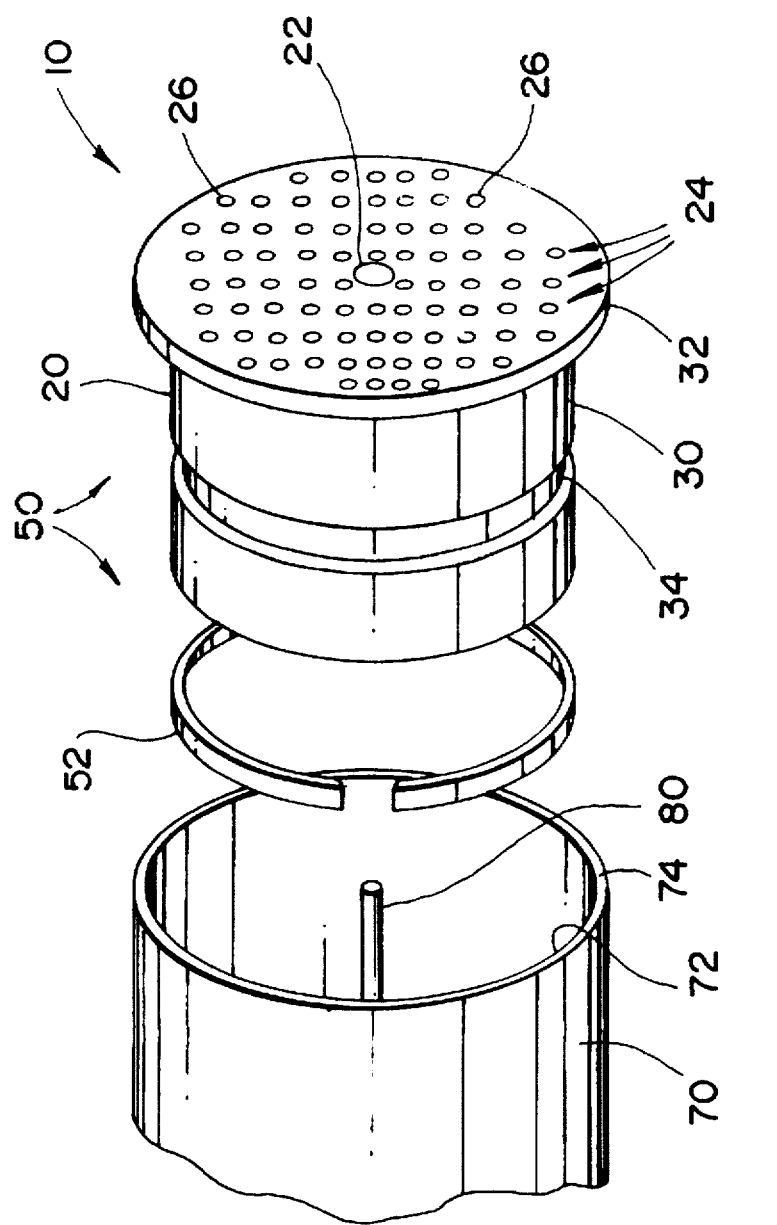
FIG. 3 is a partial isometric, exploded view of welding gun spatter shield a retaining ring and a welding gun sleeve.
Figure 7:
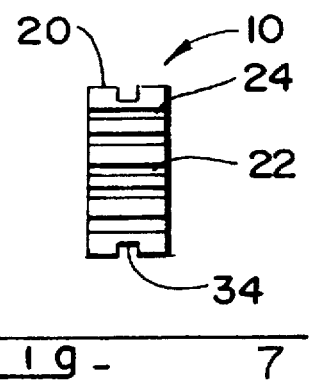
FIG. 7 is a cross sectional side elevational view of one type of welding gun spatter shield having a groove extending about the circumference of the shield at an axial position intermediate the ends of the body.

As shown in FIGS. 2 and 7, the body 20 construction may facilitate its full insertion into the opening 72. Alternatively, the body 20 may have one or more portions that do not insert into the sleeve opening 72.

In one preferred embodiment, the body 20 has an insert portion 30 and a lip portion 32. The insert portion 30 fits within the opening 72 and, therefore, has an outer diameter that is slightly less than the inner diameter of the opening 72. By contrast, the lip portion 32 has an outer diameter that is greater than the inner diameter of the sleeve 72 and does not fit within the sleeve opening 72. In this preferred embodiment, the lip portion 32 defines an abutment surface proximal the insert portion 30 that lies in a plane substantially perpendicular to the axis of the body 20. The abutment surface is preferably relatively flat and is constructed to abut the forward end 74 of the sleeve 70 when the welding gun spatter shield 10 is inserted in the opening 72. So that the welding gun spatter shield 10 will protect the forward end 74 of the sleeve 70 and prevent spatter contact therewith and accumulation thereon, the outer diameter of the lip portion 32 is preferably equal to or greater than the outer diameter of the sleeve 70 at its forward end 74.

Figure 8:
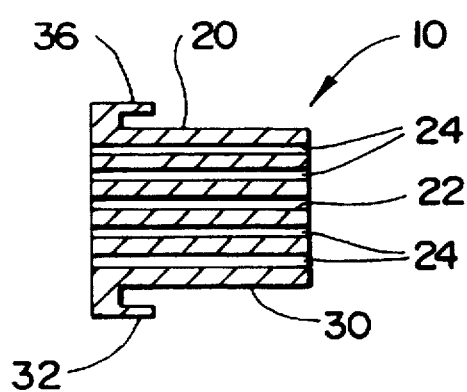
FIG. 8 is a cross sectional side elevational view of one type of welding gun spatter shield having an overhang constructed to encase the forward end of the sleeve when the welding gun spatter shield is mounted thereon.

As shown in FIG. 8, the lip portion 32 may further include an overhang 36 constructed to encase the forward end 74 of the sleeve 70 when the welding gun spatter shield 10 is mounted thereon. The overhang 36 further protects the sleeve 70 from the corrosive effects of the welding spatter by preventing welding spatter contact with the sleeve 70. This overhang 36 could be extended to cover the full length of the sleeve 70.

Figure 9:
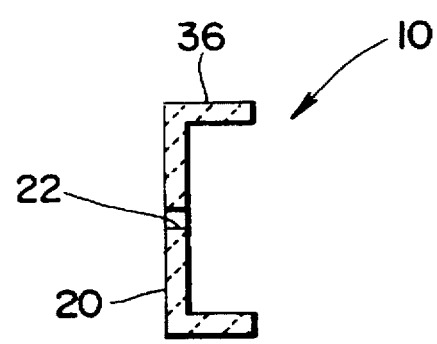
FIG. 9 is a cross sectional side elevational view of one type of welding gun spatter shield having a body that does not insert into the opening, but attaches over the forward end of the welding gun sleeve.

In another embodiment, the body 20 may comprise a body 20 that does not insert into the opening 72, but attaches over the forward end 74 of the sleeve 70 (see FIG. 9). In this embodiment, the body 20 has a diameter that is slightly greater than the outer diameter of the sleeve 70 and provides complete coverage of the opening 72. An overhang 36 attached to and extending from the periphery of the body 20 forms a cylinder. The resulting cylinder has an annular cross section and is concentric with the body 20. The inner diameter of the cylinder is slightly greater than the outer diameter of the sleeve 70; and, thus, the retaining means 50 is the friction fit between the cylinder and the sleeve 70. Therefore, the welding gun spatter shield 10 acts as a cap that covers the end of the sleeve 72.

Often, the contact tube 62 extends near the forward end 74 of the sleeve 70. Therefore, to accommodate the contact tube 62 and to permit the proper insertion of the welding gun spatter shield 10 into the sleeve 70, the body 20 may include a receiving cavity 40 in its rear surface. As shown in FIG. 1, the receiving cavity 40 extends partially through the body 20 and is sized and shaped to accommodate the contact tube 62 when the welding gun spatter shield 10 is mounted in the sleeve 70. Preferably, the receiving cavity 40 is coaxial with the body 20.

Figure 6:
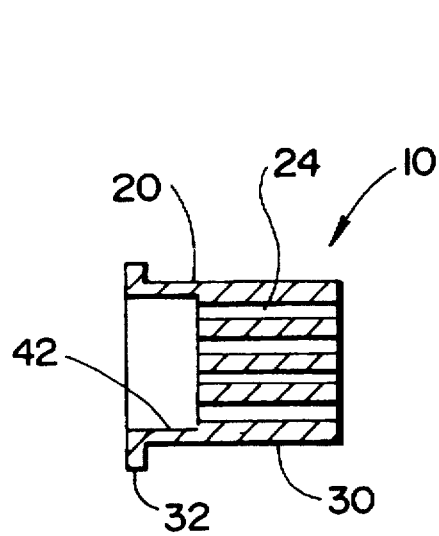
FIG. 6 is a cross sectional side elevational view of one type of welding gun spatter shield having a cylindrical forward recess.
Figure 5:
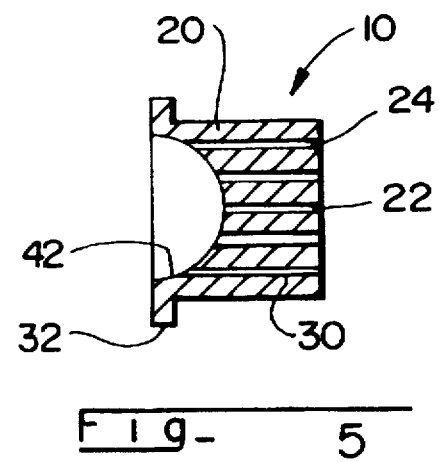
FIG. 5 is a cross sectional side elevational view of one type of welding gun spatter shield having a rounded forward recess.

To permit the welding wire 80 to extend sufficiently beyond the front surface of welding gun spatter shield 10, the body 20 may include a forward recess 42 in its front surface. As shown in FIGS. 5 and 6, the forward recess 42 sets the front surface of the body 20 back so that a welding wire 80 extending to the forward end 74 of the sleeve 70 will have more longitudinal clearance which will facilitate arcing between the welding wire 80 and the workpiece 100. The forward recess 42 may take many shapes. For example, FIG. 5 shows a semispherical forward recess 42; and FIG. 6 shows a cylindrical forward recess 42.

Retaining means 50 maintains the body 20 in the opening 72 and may take many forms. The preferred embodiment for the retaining means 50 is friction between the body 20 and the sleeve 70. Constructing the body 20 with a diameter that is very close to, but slightly less than, the diameter of the opening 72, creates sufficient friction between the body 20 and the sleeve 70 when the welding gun spatter shield 10 is in the sleeve 70. Both FIGS. 5 and 6 show welding gun spatter shields 10 that utilize friction created by a close fit as the retaining means.

A more preferred embodiment of retaining means 50 comprises a spring retaining ring 52 that fits within a groove 34 in the body 20. The groove 34 extends about the circumference of the body 20 at an axial position intermediate the ends of the body 20. Further, the groove 34 is positioned axially in the body 20 so that when the body 20 is positioned in the opening 72 the groove 34 is encompassed within the sleeve 70. The retaining ring 52 is sized and constructed to fit within the groove 34. However, the retaining ring 52 in its natural, uncompressed state has a diameter that is greater than the diameter of the opening 72. A gap in the retaining ring 52 allows it to be compressed radially permitting its placement within the opening 72 of the sleeve 70 while the retaining ring 52 is positioned in the groove 34. Because the retaining ring 52 is outwardly biased, when it is compressed, the retaining ring 52 exerts a force in the radial direction about its full circumference. Therefore, when placed within the sleeve 70, the retaining ring exerts a force against the sleeve 70. This force increases the friction between the sleeve 70 and the retaining ring 52 requiring greater axial force to effect a change in the axial position of the retaining ring 52. When compressed, the retaining ring 52 inner diameter is less than the outer diameter of the groove 34. Accordingly, the groove 34 abuts the retaining ring 52 when the retaining ring 52 is positioned within the groove 34 and the body 20 is positioned within the opening 72. Consequently, axial movement of the body 20 is made more difficult due to the increased friction created by the retaining ring 52 and its abutting relationship to the groove 34 in the body 20.

To permit the welding wire 80 to pass through the welding gun spatter shield 10, the body 20 includes a wire feed bore 22 therethrough extending in the axial direction. The diameter of the wire feed bore 22 is sufficiently large to permit the welding wire 80 to pass therethrough. Further, the wire feed bore 22 is positioned for alignment with the welding wire 80 when the body 20 is mounted in the opening 72. Typically, the sleeve 70, the contact tube 62, and the welding wire 80 are coaxial. Accordingly, the body 20 and the wire feed bore 22 are preferably also coaxial with the sleeve 70, the contact tube 62, and the welding wire 80.

So that the inert shielding gas may reach the weld, the body 20 has at least one, but preferably a plurality of, communication passageways 24 that provide fluid communication through the body 20 in an axial direction. The number and size of communication passageways 24 are sufficient to permit the flow of the required amount of inert gas therethrough for proper welding. However, the communication passageways 24 are sufficiently small that spatter may not travel therethrough. In certain materials, such as anodized aluminum or ceramic coated aluminum, the communication passageways 24 are small bores 26 that extend through the body 20 in an axial direction. In other materials, such as porous ceramic, the communication passageways 24 exist a property of the material. In other words, the material is sufficiently porous that the inert gas may pass through the body 20 without any further modification to the body 20.

In operation, the welding gun spatter shield 10 is simply inserted into the opening 72 of the sleeve 70 prior to commencing the welding operation and is maintained therein during welding. Consequently, a method of preventing welding spatter accumulation in a welding gun sleeve 72 comprises packing the opening 72 with a porous material so that the opening 72 is fully covered. The material should be capable of withstanding relatively high temperatures and preferably has anti-stick characteristics. Additionally, the method includes the steps of extending the welding wire 80 through the wire feed bore 22 and maintaining the material in the opening 72 during welding. The material may take the form of the body 20 as previously described.

I claim:

1. A welding gun spatter shield for use in a welding gun sleeve having a forward end with an opening, said shield comprising:

a body having an axis, a back end, and a front end;

said body constructed and sized to be removably inserted within said sleeve opening;

wherein, when said shield is inserted within said sleeve opening, said shield back end is distal to said sleeve forward end and said shield extends within said sleeve opening from said shield back end in the direction of said sleeve forward end so that said shield front end is at least flush with said sleeve forward end;

retaining means for removably maintaining said body in said opening;

said body constructed and sized to fill said opening and cover the full cross sectional area of said opening when mounted therein;

a wire feed bore extending through said body in an axial direction;

said wire feed bore diameter sufficiently large to permit a welding wire to pass therethrough;

said wire feed bore positioned for alignment with said welding wire when said body is mounted in said opening; and at least one communication passageway providing fluid communication through said body in an axial direction.

2. A welding gun spatter shield as claimed in claim 1 wherein said body comprises a material capable of withstanding relatively high temperatures.

3. A welding gun spatter shield as claimed in claim 1 wherein said body comprises a material that has anti-stick characteristics.

4. A welding gun spatter shield as claimed in claim 1 wherein said body is constructed of ceramic coated aluminum.

5. A welding gun spatter shield as claimed in claim 1 wherein said body is constructed of anodized aluminum.

6. A welding gun spatter shield as claimed in claim 1 wherein said body is constructed of porous ceramic.

7. A welding gun spatter shield as claimed in claim 1 wherein said body has a circular cross section throughout its full length.

8. A welding gun spatter shield as claimed in claim 7 wherein said body is cylindrical.

9. A welding gun spatter shield as claimed in claim 8 wherein said body has an outer diameter that is slightly less than the inner diameter of said opening.

10. A welding gun spatter shield as claimed in claim 1 wherein:

said body having an insert portion and a lip portion;

said insert portion having an outer diameter that is slightly less than the inner diameter of said opening;

said lip portion having an outer diameter that is equal to or greater than the outer diameter of said sleeve;

said lip portion constructed to abut said sleeve forward end; and so that said lip portion provides a shield to prevent spatter from contacting said sleeve forward end.

11. A welding gun spatter shield as claimed in claim 1 wherein said retaining means comprises:

a groove extending about the circumference of said body positioned at an intermediate axial position thereof;

an outwardly biased spring retaining ring constructed and sized to fit within said groove;

said groove abutting said retaining ring to prevent the relative axial movement thereof; and so that, when said shield is inserted in said opening, said retaining ring presses against said welding gun sleeve creating increased friction therebetween and, thereby, maintaining said body in said welding gun sleeve.

12. A welding gun spatter shield as claimed in claim 1 wherein:

said body having an outer diameter and said sleeve having an inner diameter;

said retaining means comprising said body outer diameter and said sleeve inner diameter;

wherein, when said shield is inserted in said sleeve, said body outer diameter presses against said sleeve inner diameter creating increased friction therebetween and, thereby, maintaining said body on said sleeve.

13. A welding gun spatter shield as claimed in claim 1 wherein said wire feed bore is coaxial with said body and said welding gun sleeve.

14. A welding gun spatter shield as claimed in claim 1 wherein said body has a plurality of communication passageways therethrough.

15. A welding gun spatter shield as claimed in claim 1 wherein said communication passageways comprise bores through said body.

16. A welding gun spatter shield as claimed in claim 1 wherein said body further comprises:

a receiving cavity extending partially into said body coaxial with said wire feed bore;

said receiving cavity having a diameter and length that is sufficiently large to accommodate said contact tube when said body is mounted in said sleeve; and whereby said body may fit within said opening without interference from said contact tube.

17. A welding gun spatter shield for covering an opening of a welding gun nozzle comprising:

a body having an axis;

said body constructed and sized to be removably maintained on said sleeve;

said body having a diameter that is slightly greater than the outer diameter of said sleeve;

retaining means for removably maintaining said body on a welding gun forward end;

said body constructed and sized to cover the full cross sectional area of an opening of said sleeve when mounted thereon;

a wire feed bore extending through said axis of said body having a diameter that is sufficiently large to permit a welding wire to pass therethrough; and at least one communication passageway providing fluid communication through said body in an axial direction.

18. A welding gun spatter shield for covering an opening of a welding gun nozzle as claimed in claim 17 wherein said body comprises a material capable of withstanding relatively high temperatures.

19. A welding gun spatter shield for covering an opening of a welding gun nozzle as claimed in claim 17 wherein:

said body including an overhang attached to and extending from the periphery of said body forming a cylinder that has an annular cross section and is concentric with said body;

said cylinder having an inner diameter that is slightly greater than the outer diameter of said sleeve; and said retaining means comprising said cylinder inner diameter and said sleeve outer diameter wherein, when said shield is positioned on said sleeve, said cylinder inner diameter presses against said sleeve outer diameter creating increased friction therebetween and, thereby, maintaining said body on said sleeve.

20. A method of preventing welding spatter accumulation in a welding gun sleeve having a forward end with an opening, said method comprising:

packing said sleeve opening with a porous material, capable of withstanding relatively high temperatures, so that said opening is fully covered and so that said packing extends from within said sleeve in the direction of said sleeve forward end to at least be flush with said sleeve forward end;

extending a welding wire from the welding gun through a wire feed bore in said material; and maintaining said material in said opening during welding.

* * * * *